US012759348B2

United States Patent
(12) United States Patent
Hoshiba et al.

(10) Patent No.: US 12,759,348 B2
(45) Date of Patent: Oct. 13, 2026

(54) PNEUMATIC TIRE AND METHOD FOR MANUFACTURING THE SAME

(71) Applicant: The Yokohama Rubber Co., LTD., Tokyo (JP)

(72) Inventors: Takashi Hoshiba, Hiratsuka (JP); Kazuya Ishiguro, Hiratsuka (JP); Masahiro Naruse, Hiratsuka (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 1045 days.

(21) Appl. No.: 17/262,685

(22) PCT Filed: Jul. 17, 2019

(86) PCT No.: PCT/JP2019/028155

§ 371 (c)(1),
(2) Date: Jan. 22, 2021

(87) PCT Pub. No.: WO2020/022161

PCT Pub. Date: Jan. 30, 2020

(65) Prior Publication Data

US 2021/0309054 A1 Oct. 7, 2021

(30) Foreign Application Priority Data

Jul. 24, 2018 (JP) ................................ 2018-138611

(51) Int. Cl.
*B60C 23/00* (2006.01)
*B29D 30/00* (2006.01)
(Continued)

(52) U.S. Cl.
CPC .......... *B60C 19/00* (2013.01); *B29D 30/0061* (2013.01); *B60C 5/14* (2013.01);
(Continued)

(58) Field of Classification Search
CPC ................................................ B60C 2019/004
See application file for complete search history.

(56) References Cited

U.S. PATENT DOCUMENTS 4,863,650 A * 9/1989 Kohler .................... B29C 33/64
427/407.1
7,419,557 B2 * 9/2008 Majumdar ......... B29D 30/0662
156/247
(Continued)

FOREIGN PATENT DOCUMENTS

CN 108136858 6/2018
DE 60309438 T2 9/2007
(Continued)

OTHER PUBLICATIONS

International Search Report for International Application No. PCT/JP2019/028155 dated Oct. 15, 2019, 4 pages, Japan.

*Primary Examiner* — Justin R Fischer
(74) *Attorney, Agent, or Firm* — Thorpe North & Western

(57) ABSTRACT

Provided are a pneumatic tire and a method for manufacturing the same. At least one sensor unit including a sensor that acquires tire information is fixed to a tire inner surface via an adhesive layer, and a thickness of a release agent detected by an electron microscope at least in a fixing region for the sensor unit is from 0.1 μm to 100 μm.

10 Claims, 4 Drawing Sheets

(51) Int. Cl.

| | |
|---|---|
| ***B60C 5/14*** | (2006.01) |
| ***B60C 11/24*** | (2006.01) |
| ***B60C 19/00*** | (2006.01) |
| ***B60C 23/04*** | (2006.01) |

(52) U.S. Cl.
CPC ........ *B60C 11/243* (2013.01); *B60C 23/0493* (2013.01); *B29D 2030/0077* (2013.01); *B60C 2019/004* (2013.01)

(56) References Cited

U.S. PATENT DOCUMENTS

| | | | |
|---|---|---|---|
| 2003/0155054 | A1 | 8/2003 | Bell |
| 2010/0043933 | A1 | 2/2010 | Breunig |
| 2011/0056612 | A1 | 3/2011 | Sugimoto |
| 2013/0126063 | A1 * | 5/2013 | Landers ................ B60C 13/001 428/141 |
| 2013/0228259 | A1 | 9/2013 | Breunig |
| 2015/0191053 | A1 | 7/2015 | Shouyama |
| 2015/0328942 | A1 | 11/2015 | Weston |
| 2016/0376517 | A1 | 12/2016 | Breunig et al. |
| 2018/0133934 | A1 | 5/2018 | Balnis |
| 2018/0318888 | A1 | 11/2018 | Matsumura |
| 2018/0339475 | A1 | 11/2018 | Laubry et al. |
| 2019/0329609 | A1 | 10/2019 | Puppi et al. |
| 2020/0001507 | A1 | 1/2020 | Hoshiba et al. |
| 2020/0282779 | A1 | 9/2020 | Hoshiba |
| 2020/0298515 | A1 | 9/2020 | Nishida |

FOREIGN PATENT DOCUMENTS

| | | | |
|---|---|---|---|
| JP | H06-339927 | | 12/1994 |
| JP | 2007-331295 | | 12/2007 |
| JP | 2008-044574 A | | 2/2008 |
| JP | 2009-500464 | | 1/2009 |
| JP | 4410753 | | 2/2010 |
| JP | 4428107 | * | 3/2010 |
| JP | 2011-56812 | * | 3/2011 |
| JP | 2015-107690 | | 6/2015 |
| JP | 2016-505438 | | 2/2016 |
| JP | 2016-540662 | | 12/2016 |
| JP | 6272225 | | 1/2018 |
| WO | WO 2007/003731 | | 1/2007 |
| WO | WO 2014/010728 | | 1/2014 |
| WO | WO 2014/081409 | | 5/2014 |
| WO | WO 2015/090547 | | 6/2015 |
| WO | WO 2017/072119 | | 5/2017 |
| WO | WO 2017/082162 | | 5/2017 |
| WO | WO 2017/110398 | * | 6/2017 |
| WO | WO 2018/065846 | | 4/2018 |
| WO | WO 2018/146884 | | 8/2018 |
| WO | WO 2019/049788 | | 3/2019 |
| WO | WO 2019/116645 | | 6/2019 |

* cited by examiner

PNEUMATIC TIRE AND METHOD FOR MANUFACTURING THE SAME

TECHNICAL FIELD

The present technology relates to a pneumatic tire including a sensor unit that acquires tire information and a method for manufacturing the same, and particularly to a pneumatic tire and a method for manufacturing the same that can provide enhanced adhesiveness between a tire inner surface and a sensor unit while ensuring air retention properties by bonding the sensor unit to the tire inner surface in a state where a release agent is applied to the tire inner surface.

BACKGROUND ART

To acquire tire internal information such as internal pressure and temperature, various sensors are installed in a tire cavity (for example, see Japan Patent No. 6272225 and Japan Unexamined Patent Publication No. 2016-505438).

On the other hand, in vulcanizing a green tire by using a bladder, the bladder is likely to bond to an inner surface of the green tire, and thus, a release agent is applied to the inner surface of the green tire to prevent bonding of the green tire and the bladder. In such a case, in an attempt to directly bond and fix the sensor unit to the tire inner surface, there is a problem of poor adhesiveness between the tire inner surface to which the release agent is applied and the sensor unit, and of easy peeling of the sensor unit.

In contrast, it has been proposed to apply a release agent to an inner surface of a green tire, vulcanize the green tire, and then buff the tire inner surface to remove the release agent (for example, Japan Patent No. 4410753). However, there is a problem in such buffing that reduces a gauge of an innerliner, and thus degrades air retention properties. Additionally, it has been proposed to bond a film to an inner surface of a green tire in advance, apply a release agent to the inner surface of the green tire in a state where the film is bonded to the inner surface, vulcanize the green tire, and then peel the film to remove the release agent (for example, Japan Unexamined Patent Publication No. 2015-107690). However, there is a problem of degradation of air retention properties due to the step of peeling the film after vulcanization. Moreover, it has been proposed to clean a tire inner surface to which a release agent is applied. However, there is a problem in such a technique that cannot sufficiently remove the release agent.

SUMMARY

The present technology provides a pneumatic tire and a method for manufacturing the same that can provide enhanced adhesiveness between a tire inner surface and a sensor unit while ensuring air retention properties by bonding the sensor unit to the tire inner surface in a state where a release agent is applied to the tire inner surface.

A pneumatic tire according to an embodiment of the present technology includes at least one sensor unit fixed to a tire inner surface via an adhesive layer and includes a sensor that acquires tire information, and a thickness of a release agent detected by an electron microscope at least in a fixing region for the sensor unit is from 0.1 μm to 100 μm.

A method for manufacturing a pneumatic tire according to an embodiment of the present technology is a method for manufacturing a pneumatic tire including vulcanizing a green tire by using a bladder including a coating layer made of a release agent, the method including, in fixing a sensor unit to an inner surface of a tread portion of a vulcanized pneumatic tire, setting a thickness of the release agent detected by an electron microscope at least in a fixing region for the sensor unit to from 0.1 μm to 100 μm, and fixing the sensor unit to the fixing region for the sensor unit via an adhesive layer.

Additionally, a method for manufacturing a pneumatic tire according to an embodiment of the present technology includes, in fixing a sensor unit to a tire inner surface, irradiating the tire inner surface with a laser to remove a release agent, setting a thickness of the release agent detected by an electron microscope at least in a fixing region for the sensor unit to from 0.1 μm to 100 μm, and fixing the sensor unit to the fixing region for the sensor unit via an adhesive layer.

In an embodiment of the present technology, the thickness of a release agent detected by an electron microscope at least in a fixing region for a sensor unit is set to from 0.1 μm to 100 μm, and the sensor unit is fixed in a state where a trace amount of the release agent is applied to a tire inner surface. Thus, while the release agent inhibits permeation of air from the tire inner surface and air retention properties improve, the adhesiveness between the tire inner surface and the sensor unit can be ensured sufficiently.

In an embodiment of the present technology, preferably, adhesive strength of the adhesive layer ranges from 0.4 $N/mm^2$ to 100 $N/mm^2$. Accordingly, work of installing the sensor unit can be performed easily while maintaining good adhesive strength of the adhesive layer. The adhesive strength (tensile shear adhesive strength) of the adhesive layer complies with any of JIS (Japanese Industrial Standard)-K6850 and JIS-Z0237, and is measured in a standard state (23° C. and RH 50%).

In an embodiment of the present technology, preferably, the adhesive layer is made of a cyanoacrylate-based adhesive. Accordingly, working time for installing the sensor unit can be reduced.

In an embodiment of the present technology, preferably, the sensor unit is disposed in an inner side of a ground contact edge in a tire width direction. Accordingly, in a case of a sensor that detects an amount of wear of a tread portion, the sensor can accurately acquire tire information.

In an embodiment of the present technology, preferably, the sensor unit is bonded directly to the tire inner surface. Accordingly, in a case of a sensor that detects an amount of wear of a tread portion, the sensor can accurately acquire tire information.

In an embodiment of the present technology, preferably, a base is inserted between the sensor unit and the adhesive layer. Accordingly, in a case where a material that can follow tire deformation is used as a material for the base, peeling of the sensor unit due to the tire deformation can be prevented.

In an embodiment of the present technology, preferably, at a step of forming the coating layer in the bladder, coating time t (hour) and temperature T (° C.) of the coating layer satisfy $t \geq 0.0001\,T^2 - 0.07\,T + 9$ and $T \leq 180°$ C. Accordingly, in the bladder including the coating layer, time for coating the release agent can be reduced, and shortening of a bladder life can be prevented.

In an embodiment of the present technology, ground contact edge refers to an end portion in the tire axial direction of a tire mounted on a regular rim and inflated to a regular internal pressure, and placed vertically on a flat surface with a regular load applied to the tire. "Regular rim" refers to a rim defined by a standard for each tire according to a system of standards that includes standards with which tires comply, and is a "standard rim" defined by the Japan Automobile Tyre Manufacturers Association Inc. (JATMA), a "Design Rim" defined by the Tire and Rim Association, Inc. (TRA), or a "Measuring Rim" defined by the European Tyre and Rim Technical Organisation (ETRTO). In a system of standards including standards with which tires comply, "regular internal pressure" refers to air pressure defined by each of the standards for each tire and is "maximum air pressure" defined by JATMA, a maximum value described in the table "TIRE LOAD LIMITS AT VARIOUS COLD INFLATION PRESSURES" defined by TRA, or "INFLATION PRESSURE" defined by ETRTO. However, "regular internal pressure" is 250 kPa in a case where a tire is a tire for a passenger vehicle. "Regular load" is a load defined by a standard for each tire according to a system of standards that includes standards with which tires comply, and is a "maximum load capacity" defined by JATMA, a maximum value described in the table "TIRE LOAD LIMITS AT VARIOUS COLD INFLATION PRESSURES" defined by TRA, or "LOAD CAPACITY" defined by ETRTO. However, "regular load" is a load corresponding to 80% of the load described above in a case where a tire is a tire for a passenger vehicle.

DETAILED DESCRIPTION

Figure 1:
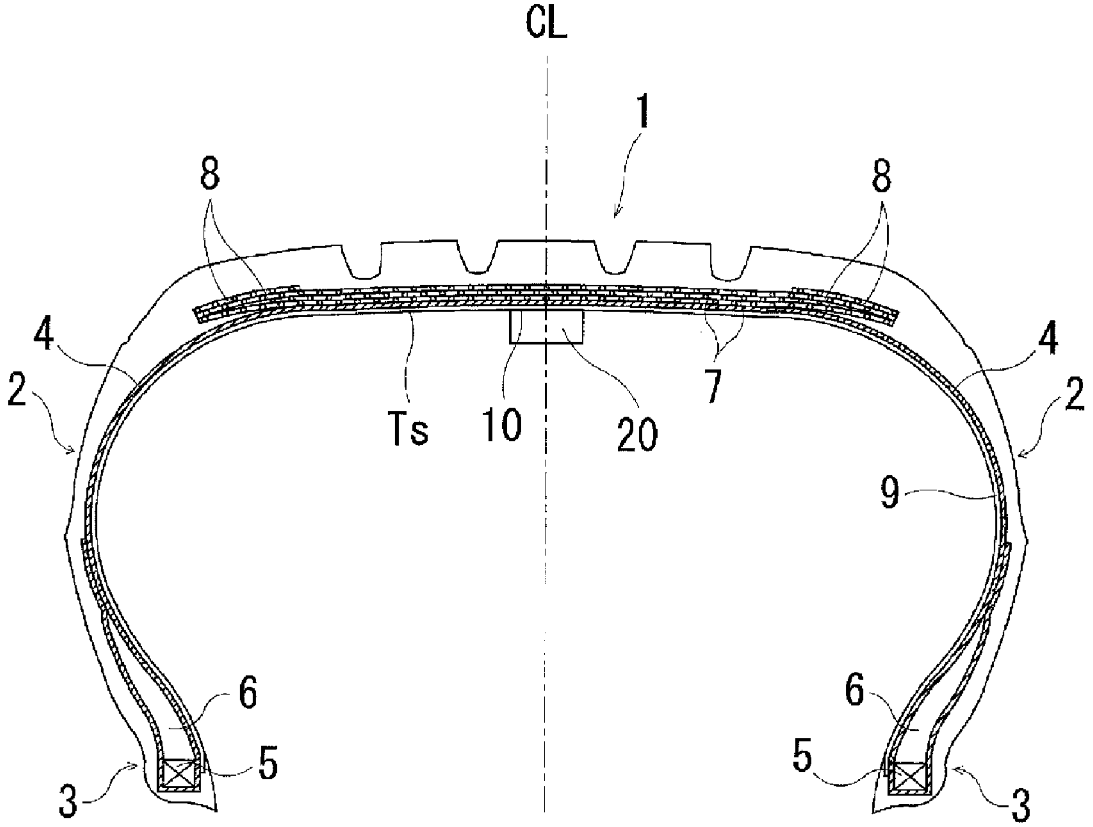
FIG. 1 is a meridian cross-sectional view illustrating an example of a pneumatic tire according to an embodiment of the present technology.
Figure 2:
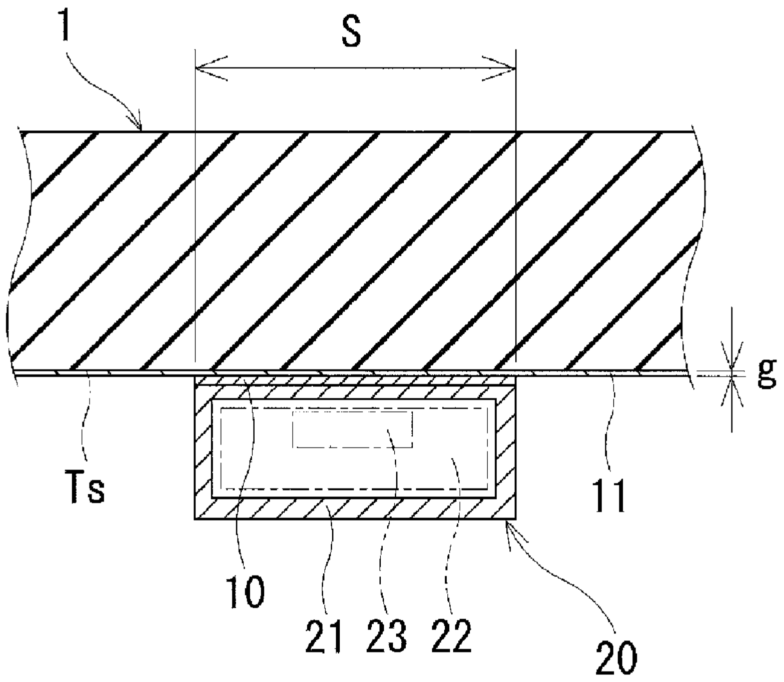
FIG. 2 is an enlarged cross-sectional view of a portion of the pneumatic tire of FIG. 1.

Configurations of embodiments of the present technology will be described in detail below with reference to the accompanying drawings. FIGS. 1 and 2 illustrate a pneumatic tire according to an embodiment of the present technology. Note that in FIG. 1, CL denotes a tire center line.

As illustrated in FIG. 1, a pneumatic tire according to an embodiment of the present technology includes a tread portion 1 having an annular shape and extending in the tire circumferential direction, a pair of sidewall portions 2, 2 disposed in both sides of the tread portion 1, and a pair of bead portions 3, 3 disposed in inner sides of the sidewall portions 2 in the tire radial direction.

A carcass layer 4 is mounted between the pair of bead portions 3, 3. The carcass layer 4 includes a plurality of reinforcing cords extending in the tire radial direction and is folded back around a bead core 5 disposed in each of the bead portions 3 from a tire inner side to a tire outer side. A bead filler 6 having a triangular cross-sectional shape and formed of a rubber composition is disposed on an outer circumference of the bead core 5. Then, an innerliner 9 is disposed in a region between the pair of bead portions 3, 3 in the tire inner surface. The innerliner 9 forms a tire inner surface Ts.

On the other hand, a plurality of belt layers 7 are embedded in an outer circumferential side of the carcass layer 4 in the tread portion 1. The belt layers 7 include a plurality of reinforcing cords that are inclined with respect to the tire circumferential direction, and are disposed with the reinforcing cords intersecting each other between the layers. In the belt layers 7, an inclination angle of the reinforcing cords with respect to the tire circumferential direction is set within the range of from 10° to 40°, for example. Steel cords are preferably used as the reinforcing cords of the belt layers 7. To improve high-speed durability, at least one belt cover layer 8 formed by arranging reinforcing cords at an angle of, for example, not greater than 5° with respect to the tire circumferential direction is disposed in the outer circumferential side of the belt layers 7. Organic fiber cords such as nylon, and aramid are preferably used as the reinforcing cords of the belt cover layer 8.

Note that the tire internal structure described above represents a typical example for a pneumatic tire, but is not limited to this.

In the pneumatic tire described above, at least one sensor unit 20 is fixed in a region corresponding to the tread portion 1 of the tire inner surface Ts. As illustrated in FIG. 2, the sensor unit 20 is bonded to the tire inner surface Ts via an adhesive layer 10.

The adhesive layer 10 can include a liquid adhesive or a double sided adhesive tape. Examples of the adhesive include a reaction curable adhesive including an epoxy resin or a urethane resin. Particularly, the adhesive layer 10 may include a cyanoacrylate-based adhesive (instantaneous adhesive) to reduce working time for installing the sensor unit 20 in the tire inner surface Ts.

The sensor unit 20 includes a housing 21 and an electronic component 22. The housing 21 has a hollow structure, and accommodates the electronic component 22 inside. The electronic component 22 includes a sensor 23 that acquires tire information, a transmitter, a receiver, a control circuit, a battery, and the like as appropriate. Examples of the tire information acquired by the sensor 23 include internal temperature and internal pressure of the pneumatic tire, and an amount of wear of the tread portion 1. For example, a temperature sensor or a pressure sensor is used to measure internal temperature or internal pressure. In a case where an amount of wear of the tread portion 1 is detected, a piezoelectric sensor that comes into contact with the tire inner surface Ts can be used as the sensor 23, and the piezoelectric sensor detects an output voltage corresponding to deformation of a tire during traveling, and detects an amount of wear of the tread portion 1 based on the output voltage. Moreover, an acceleration sensor or a magnetic sensor can also be used. Additionally, the sensor unit 20 is configured to transmit the tire information acquired by the sensor 23 to an outside of the tire. Note that the internal structure of the sensor unit 20 illustrated in FIG. 2 is an example of the sensor unit, and is not limited to this.

In the pneumatic tire described above, a release agent layer 11 including a release agent applied in a process of manufacturing a pneumatic tire is present between the tire inner surface Ts and the adhesive layer 10. That is, the sensor unit 20, the adhesive layer 10, and the release agent layer 11 are layered in order from the inner side in the tire radial direction. A thickness g of the release agent layer 11 is from 0.1 μm to 100 μm at least in a fixing region S for the sensor unit 20 of the tire inner surface Ts. The thickness g of the release agent layer 11 can be detected by using an electron microscope. In measuring the thickness g of the release agent layer 11 by an electron microscope, the thicknesses of the release agent layer 11 are measured at a total of five locations including a center point of the fixing region S for the sensor unit 20, two locations in both sides in the tire circumferential direction with the center point as the center, and two locations in both sides in the tire width direction with the center point as the center, and the thicknesses at the five locations are averaged to calculate the thickness g (average thickness) of the release agent layer 11.

Examples of a component that can be compounded in the release agent layer 11 include a component containing a silicone component as an active ingredient. Examples of the silicone component include organopolysiloxanes, for example, dialkylpolysiloxane, alkylphenylpolysiloxane, alkylaralkylpolysiloxane, and 3,3,3-trifluoropropylmethylpolysiloxane. Dialkylpolysiloxane is, for example, dimethylpolysiloxane, diethylpolysiloxane, methylisopropyl polysiloxane, or methyldodecylpolysiloxane. Alkylphenylpolysiloxane is, for example, methylphenylpolysiloxane, a dimethylsiloxane-methylphenylsiloxane copolymer, or a dimethylsiloxane-diphenylsiloxane copolymer. Alkylaralkylpolysiloxane is, for example, methyl (phenylethyl) polysiloxane or methyl (phenylpropyl) polysiloxane. One type or two or more types of these organopolysiloxanes may be used in combination.

In the pneumatic tire described above, the thickness g of the release agent detected by an electron microscope at least in the fixing region S for the sensor unit 20 is set to from 0.1 μm to 100 μm, and the sensor unit 20 is fixed in a state where a trace amount of the release agent is applied to the tire inner surface Ts. Thus, while the release agent inhibits permeation of air from the tire inner surface Ts and air retention properties improve, the adhesiveness between the tire inner surface Ts and the sensor unit 20 can be ensured sufficiently. Here, when the thickness g of the release agent in the fixing region S for the sensor unit 20 is less than 0.1 μm, improvement of air retention properties cannot be obtained, and when the thickness g is more than 100 μm, the adhesiveness of the sensor unit 20 degrades, and durability cannot be obtained sufficiently.

In FIG. 1 and FIG. 2, the sensor unit 20 is disposed in an inner side of the ground contact edge in the tire width direction. In the case of the sensor 23 that detects an amount of wear of the tread portion 1, the sensor unit 20 is disposed in this way, and thus the sensor 23 can accurately acquire the tire information.

Additionally, the sensor unit 20 is bonded directly to the tire inner surface Ts. In the case of the sensor 23 that detects an amount of wear of the tread portion 1, the sensor unit 20 is bonded directly to the tire inner surface Ts in this way, and thus the sensor 23 can accurately acquire the tire information.

In the pneumatic tire described above, the adhesive strength of the adhesive layer 10 preferably ranges from 0.4 $N/mm^2$ to 100 $N/mm^2$. Particularly, the adhesive strength preferably ranges from 5.0 $N/mm^2$ to 80 $N/mm^2$. The adhesive strength of the adhesive layer 10 is appropriately set in this way, and thus work of installing the sensor unit 20 can be performed easily while maintaining good adhesive strength of the adhesive layer 10. Here, when the adhesive strength of the adhesive layer 10 is less than 0.4 $N/mm^2$, the adhesiveness between the tire inner surface Ts and the sensor unit 20 degrades, and the sensor unit 20 easily peels. On the other hand, when the adhesive strength of the adhesive layer 10 is more than 100 $N/mm^2$, replacement work in replacing the sensor unit 20 cannot be performed easily.

Figure 3:
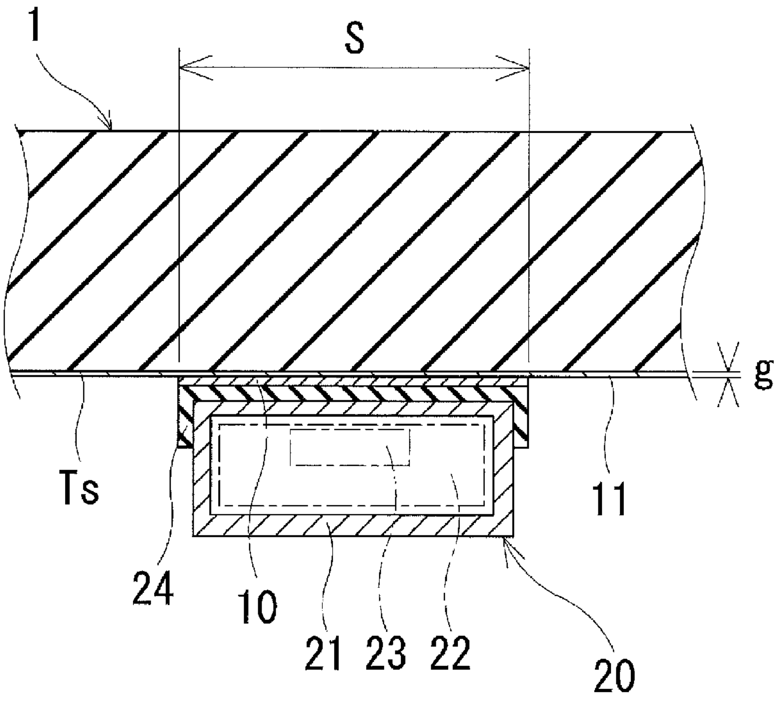
FIG. 3 is a cross-sectional view of a modified example of a pneumatic tire according to an embodiment of the present technology.

FIG. 3 illustrates a modified example of a pneumatic tire according to an embodiment of the present technology. As illustrated in FIG. 3, a base 24 that holds a sensor unit 20 is inserted between the sensor unit 20 and an adhesive layer 10. The base 24 functions as a cushioning material to prevent the sensor unit 20 from peeling due to tire deformation. As a material for the base 24, natural rubber (NR), chloroprene rubber (Cr), butyl rubber (IIR), ethylene-propylene-diene rubber (EPDM), urethane rubber, NBR, a thermoplastic elastomer, and a thermosetting elastomer can be exemplified. In a case where the base 24 is made of any of these materials, the base 24 is less likely to be damaged by tire deformation. Particularly, the base 24 may be made of rubber having tensile elongation at break of 80% or more. Additionally, the base 24 is preferably in a solid state, and is more preferably porous. In a case where the base 24 is porous, the base 24 has an excellent cushioning effect and is advantageous against peeling of the sensor unit 20 due to tire deformation. The base 24 is made of any of the above-described materials, and thus the base 24 can follow tire deformation, and can prevent peeling of the sensor unit 20 due to tire deformation. Note that, in the embodiment illustrated in FIG. 3, the example in which the base 24 is formed in a U shape in a cross-sectional view in the tire width direction is described, but the shape of the base 24 is not particularly limited. In FIG. 3, a fixing region S for the sensor unit 20 corresponds to a fixing region for the base 24 that holds the sensor unit 20.

Figure 4:
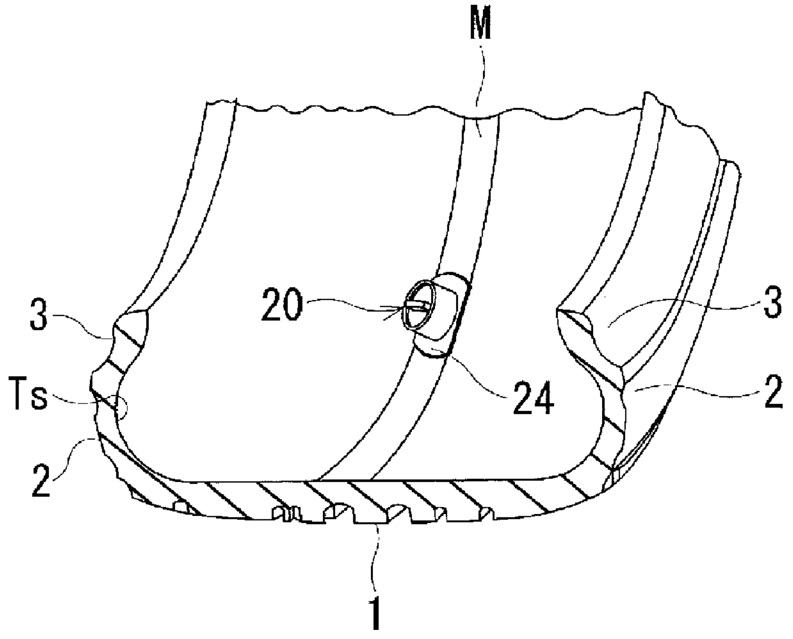
FIG. 4 is a perspective view of another modified example of a pneumatic tire according to an embodiment of the present technology.

FIG. 4 illustrates another modified example of a pneumatic tire according to an embodiment of the present technology. As illustrated in FIG. 4, a sensor unit 20 is bonded to a smooth surface M of a tire inner surface Ts via an adhesive layer 10. The smooth surface M is formed in a central portion in the tire width direction in performing vulcanization molding by using a bladder. The smooth surface M is an annular flat surface extending in the tire circumferential direction. In a case where the sensor unit 20 is disposed on the smooth surface M of the tire inner surface Ts, the adhesiveness between the tire inner surface Ts and the sensor unit 20 can be enhanced effectively. Note that in FIG. 4, a fixing region S for the sensor unit 20 corresponds to a fixing region for a base 24 that holds the sensor unit 20.

Next, a method for manufacturing a pneumatic tire according to an embodiment of the present technology will be described. In vulcanizing a green tire, a bladder is coated (preferably baked) with a release agent in advance, and a coating layer made of the release agent is formed in an outer surface of the bladder. The step of forming the coating layer in the outer surface of the bladder is performed, while, for example, after application of the release agent, the bladder is stored at 150° C. for 1 hour, at 90° C. for 4 hours, or at ambient temperature for 8 hours. Additionally, the step of forming the coating layer in the outer surface of the bladder is performed once or more and three times or less. The green tire is vulcanized by using the bladder in which the coating layer is formed in this way. Then, in the vulcanized tire, the sensor unit 20 is fixed to the fixing region S for the sensor unit 20 in the tire inner surface Ts of the tread portion 1 via the adhesive layer 10. In a case where vulcanization is performed by using the bladder including the coating layer made of the release agent in this way, the release agent layer 11 is formed in the tire inner surface Ts of the vulcanized pneumatic tire. In the release agent layer 11, the release agent is not transferred entirely in the tire inner surface Ts, but is scattered in the tire inner surface Ts.

Instead of performing vulcanization by using the bladder including the coating layer made of the release agent as described above, the step of vulcanizing the green tire can also include applying the release agent to an inner surface of the green tire, vulcanizing the green tire by using a regular bladder, and then irradiating the tire inner surface Ts of the vulcanized tire with a laser to remove the release agent applied to the tire inner surface Ts.

As described above, vulcanization is performed by using the bladder including the coating layer made of the release agent, or vulcanization is performed by using a regular bladder and the tire inner surface Ts of the vulcanized tire is irradiated with a laser to remove the release agent, and thus the thickness g of the release agent can be set to from 0.1 μm to 100 μm at least in the fixing region S for the sensor unit 20. In a case where a trace amount of the release agent is applied to the tire inner surface Ts in this way, while the release agent inhibits permeation of air from the tire inner surface Ts and air retention properties improve, the adhesiveness between the tire inner surface Ts and the sensor unit 20 can be ensured sufficiently.

Particularly, at the step of forming the coating layer in the outer surface of the bladder, coating time t (hours) and temperature T (° C.) of the coating layer preferably satisfy $t \geq 0.0001\ T^2 - 0.07\ T + 9$ and $T \leq 180°$ C. Additionally, preferably, the relationship between the coating time t and the temperature T described above is satisfied, and the coating time t ranges from 1 to 8 hours. Further, more preferably, the temperature T is 90° C. and the coating time t is 4 hours, and most preferably, the temperature T is 150° C. and the coating time t is 1 hour. Satisfying such conditions, in the bladder including the coating layer, time for coating the release agent can be reduced and shortening of a bladder life can be prevented. Here, as the temperature T (° C.) is higher, the coating layer can be formed in shorter time but the bladder is more likely to deteriorate, and the bladder life is shortened.

EXAMPLES

Tires according to Comparative Examples 1 to 5 and Examples 1 to 7 were manufactured. The tires each have a tire size of 275/40R21 and include at least one sensor unit fixed to a tire inner surface via an adhesive layer and including a sensor that acquires tire information. A method for removing a release agent, application of the release agent to the tire inner surface, use of a bladder including a coating layer made of the release agent during vulcanization, and the thickness of the release agent in the tire inner surface are set as indicated in Table 1.

As for Comparative Example 1, the release agent was applied to the tire inner surface, and work of removing the release agent was not performed. Additionally, as for Comparative Examples 2 to 4, the release agent was applied to the tire inner surface, and work of removing the release agent was performed after the end of the vulcanization step. Specifically, in Comparative Example 2, the release agent in the tire inner surface was removed by buffing, and in Comparative Example 3, a film bonded to the tire inner surface in advance was peeled to remove the release agent from the tire inner surface, and in Comparative Example 4, the tire inner surface was cleaned to remove the release agent from the tire inner surface.

Note that in Table 1, the thickness (μm) of the release agent in the tire inner surface is obtained by using a scanning electron microscope (SEM-EDX) to measure the thicknesses of the release agent at a total of five locations including a center point of the fixing region for the sensor unit in each test tire obtained after the end of the manufacture step, two locations in both sides in the tire circumferential direction with the center point as the center, and two locations in both sides in the tire width direction with the center point as the center, and averaging the measurement values.

The test tires were evaluated for the adhesiveness of the sensor unit and air retention properties by a test method described below. The results of the evaluation are also indicated in Table 1. Further, the tires according to Examples 1 to 3 and 5 to 7 and Comparative Example 5 were evaluated for bladder life, and the results of the evaluation are also indicated in Table 1.

Adhesiveness of Sensor Unit

Adhesiveness of the sensor unit as used here indicates evaluation of peeling in an adhering surface between the tire inner surface and the sensor unit. Each of the test tires was mounted on a wheel having a rim size of 21×9.5 J, and a running test was performed by using a drum testing machine at running speed of 80 km/h, air pressure of 120 kPa, a load of 8.5 kN, and a running distance of 6480 km. After the test was performed, presence of falling off or peeling of the sensor unit was visually observed. The case where there is no falling off and no peeling of the sensor unit is indicated by "excellent," the case where less than ⅛ of all the sensor unit peeled is indicated by "good," the case where ⅛ or more and less than ¼ of all the sensor unit peeled is indicated by "fair," and the case where ¼ or more of all the sensor unit peeled is indicated by "poor."

Air Retention Properties

Each of the test tires was mounted on a wheel having a rim size of 21×9.5 J, and left for 24 hours at an air pressure of 270 kPa and a temperature of 21° C. Then, an initial air pressure of 250 kPa was set, and air pressure was measured for 42 days. An inclination of an air leakage amount from the 15th day to the 42nd day was determined. The evaluation results are expressed as index values by using reciprocals of measurement values, with Comparative Example 1 being assigned as the reference 100. The larger index values mean excellent air retention properties.

Bladder Life

Vulcanization was performed by using a bladder including a coating layer made of a release agent, and the number of green tires that enabled vulcanization in a state where the thickness of the release agent transferred to a tire inner surface was within the range specified in an embodiment of the present technology was measured. Evaluation results are expressed as index values, with Example 1 being assigned as the reference 100. The larger index values mean a more excellent bladder life.

TABLE 1-1

| | Comparative Example 1 | Comparative Example 2 | Comparative Example 3 | Comparative Example 4 |
|---|---|---|---|---|
| Method for removing release agent | — | Buffing | Peeling of film | Cleaning |
| Application of release agent to tire inner surface | Yes | Yes | Yes | Yes |

TABLE 1-1-continued

| | Comparative Example 1 | Comparative Example 2 | Comparative Example 3 | Comparative Example 4 |
|---|---|---|---|---|
| Use of bladder including coating layer made of release agent during vulcanization | No | No | No | No |
| Thickness of release agent in tire inner surface (μm) | 450 | 0 | 0 | 150 |
| Coating time t (upper stage) and temperature T (lower stage) of coating layer | — | — | — | — |
| Adhesiveness of sensor unit | Poor | Excellent | Excellent | Fair |
| Air retention properties | 100 | 89 | 96 | 100 |
| Bladder life | — | — | — | — |

TABLE 1-2

| | Example 1 | Example 2 | Example 3 | Example 4 |
|---|---|---|---|---|
| Method for removing release agent | — | — | — | Laser irradiation |
| Application of release agent to tire inner surface | No | No | No | Yes |
| Use of bladder including coating layer made of release agent during vulcanization | Yes | Yes | Yes | No |
| Thickness of release agent in tire inner surface (μm) | 0.1 | 20 | 100 | 100 |
| Coating time t (upper stage) and temperature T (lower stage) of coating layer | 2 h<br>23° C. | 5 h<br>23° C. | 8 h<br>23° C. | — |
| Adhesiveness of sensor unit | Excellent | Excellent | Good | Good |
| Air retention properties | 98 | 99 | 100 | 100 |
| Bladder life | 100 | 100 | 102 | — |

TABLE 1-3

| | Comparative Example 5 | Example 5 | Example 6 | Example 7 |
|---|---|---|---|---|
| Method for removing release agent | — | — | — | — |
| Application of release agent to tire inner surface | No | No | No | No |
| Use of bladder including coating layer made of release agent during vulcanization | Yes | Yes | Yes | Yes |
| Thickness of release agent in tire inner surface (μm) | 110 | 100 | 100 | 100 |
| Coating time t (upper stage) and temperature T (lower stage) of coating layer | 9 h<br>23° C. | 4 h<br>90° C. | 1 h<br>150° C. | 30 min<br>170° C. |
| Adhesiveness of sensor unit | Fair | Good | Good | Good |
| Air retention properties | 100 | 100 | 100 | 100 |
| Bladder life | 101 | 103 | 105 | 101 |

As can be seen from Table 1, as compared with Comparative Example 1, in the pneumatic tires according to Examples 1 to 7, the adhesiveness of the sensor unit was enhanced while maintaining air retention properties. Particularly, in Examples 3 and 5 to 7, bladder life was enhanced. 10

On the other hand, in Comparative Example 2, since the tire inner surface was buffed, a gauge of an innerliner became thin, and thus air retention properties degraded. In Comparative Example 3, since the film was bonded to the tire inner surface and was peeled after vulcanization, air retention properties degraded. In Comparative Example 4, although the tire inner surface was cleaned, the release agent in the tire inner surface could not completely be removed, and a relatively large amount of the release agent remained in the tire inner surface. Thus, the adhesiveness of the sensor unit decreased. In Comparative Example 5, a large thickness of the release agent transferred to the tire inner surface was set, and thus an effect of enhancing the adhesiveness of the sensor unit was insufficient.

The invention claimed is:

1. A pneumatic tire, comprising: at least one sensor unit fixed to a tire inner surface via an adhesive layer and comprising a sensor that acquires tire information; a thickness of a release agent detected by an electron microscope at least in a fixing region for the sensor unit being from 0.1 μm to 100 μm; wherein the adhesive layer directly contacts the release agent and the adhesive layer includes a cyanoacrylate-based adhesive, an epoxy resin or a urethane resin, and the release agent comprises one or more organopolysiloxanes as an active ingredient.

2. The pneumatic tire according to claim 1, wherein adhesive strength of the adhesive layer ranges from 0.4 $N/mm^2$ to 100 $N/mm^2$.

3. The pneumatic tire according to claim 2, wherein the adhesive layer is made of the cyanoacrylate-based adhesive.

4. The pneumatic tire according to claim 3, wherein the sensor unit is disposed in an inner side of a ground contact edge in a tire width direction.

5. The pneumatic tire according to claim 4, wherein the sensor unit is bonded directly to the tire inner surface.

6. The pneumatic tire according to claim 4, wherein a base is inserted between the sensor unit and the adhesive layer.

7. The pneumatic tire according to claim 1, wherein the adhesive layer is made of the cyanoacrylate-based adhesive.

8. The pneumatic tire according to claim 1, wherein the sensor unit is disposed in an inner side of a ground contact edge in a tire width direction.

9. The pneumatic tire according to claim 1, wherein the sensor unit is bonded directly to the tire inner surface.

10. The pneumatic tire according to claim 1, wherein a base is inserted between the sensor unit and the adhesive layer.

* * * * *